R. O. GROSCHUPP.
SAFETY CHECK.
APPLICATION FILED MAY 6, 1918.

1,277,570.

Patented Sept. 3, 1918.

INVENTOR
R. O. GROSCHUPP.
BY
N. S. Hill
ATTORNEY.

UNITED STATES PATENT OFFICE.

REINHARDT O. GROSCHUPP, OF OLEAN, NEW YORK.

SAFETY-CHECK.

1,277,570.  Specification of Letters Patent.  Patented Sept. 3, 1918.

Application filed May 6, 1918. Serial No. 232,889.

*To all whom it may concern:*

Be it known that I, REINHARDT O. GROSCHUPP, a citizen of the United States, residing at Olean, in the county of Cattaraugus, State of New York, have invented a new and useful Safety-Check; and I do hereby declare the following to be a full, clear, and exact description of the invention, such as will enable others skilled in the art to which it appertains to make and use the same.

The present invention relates to a safety check, and has for its object to provide a device of this character which is provided with novel marginal coupons adapted to be cut in such a manner that coupon tabs remaining upon the check will indicate the exact amount of the check, thereby preventing any possibility of the check being raised.

Further objects of the invention are to provide a safety check which can be printed in substantially the same manner as an ordinary check without entailing any material increase in the cost of producing the same, which can be cut to indicate with accuracy any desired sum of money within wide limits, and which enables the amount for which the check has been drawn to be quickly checked up before payment is made, thereby preventing payment if the amount written on the face of the check has been altered or raised.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Corresponding and like parts are referred to in the following description and indicated in all the views of the drawings by the same reference characters.

Figure 1:
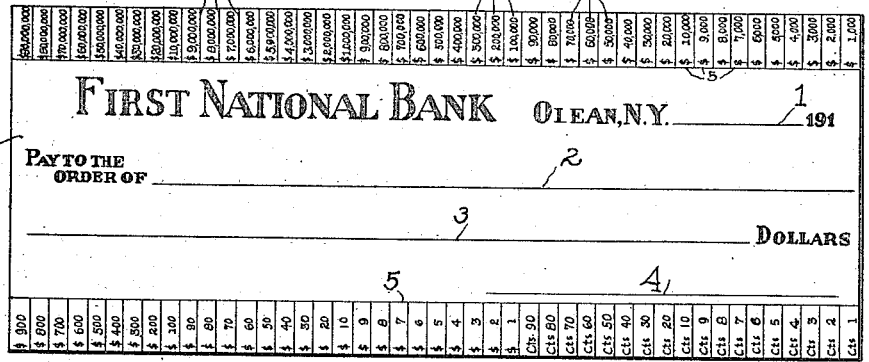
Figure 1 is a front elevation of a blank check which has been prepared in accordance with the invention.
Figure 2:
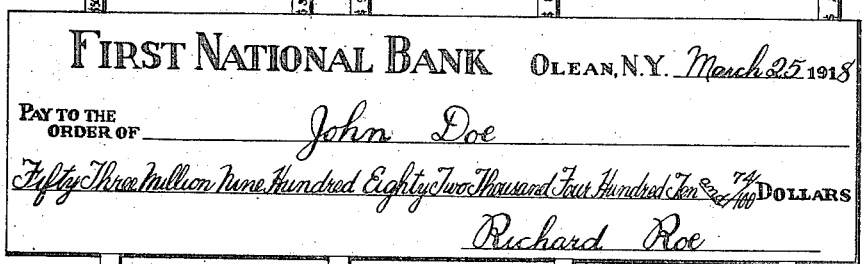
Fig. 2 is a similar view showing the check after it has been made out for a certain sum of money and the marginal coupons at the top and bottom thereof cut away to indicate the amount for which the check has been made out and prevent the raising thereof.
Figure 3:
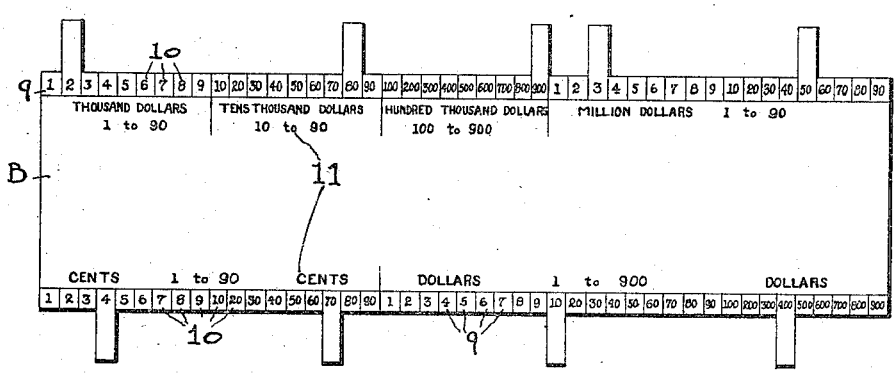
Fig. 3 is a rear view of the check shown by Fig. 2, showing the same before the coupon tabs have been folded rearwardly, into their final position against the back of the check.

A check which has been prepared in accordance with the present invention is provided in the usual manner upon the front face A thereof with a space 1 to receive the date, a space 2 to receive the name of the payee, a space 3 within which the amount of the check is written, and a space 4 for the name of the payor. In these respects the check is the same as the usual check which is now in common use. However, with the present construction the upper and lower longitudinal edges of the check are formed with marginal extensions which may be divided from the body of the check by suitable lines 5, and which are in turn subdivided by transverse lines 6 into a series of similarly shaped coupons 7, the various coupons being independent of each other so that any desired number of coupons may be cut away and completely severed from the body of the check, leaving a few selected coupons attached thereto and projecting from the upper and lower edges thereof, as indicated by Figs. 2 and 3. The various coupons 7 contain numbers 8 indicating various numerical values, the values progressing systematically from 1¢ to some large amount such as $90,000,000. Any sum of money between the amount of 1¢ and the sum total of the values of all of the coupons can then be indicated by cutting away the necessary coupons so that the sum of the values indicated by the coupons remaining attached to the check will correspond to the desired value. At the bottom of the check the numerical values 8 upon the coupons 7 run consecutively from 1¢ to 10¢, then by tens from 10¢ to 90¢, then consecutively from $1. to $10., then by tens from $10. to $100., and finally by hundreds from $100. to $900. At the top of the check the numerical values run consecutively from $1,000. to $9,000., then by tens from $10,000. to $90,000., then by hundreds from $100,000. to $900,000., then consecutively from $1,000,000. to $9,000,000., and by tens from $10,000,000. to $90,000,000.

The back B of the check is shown by Fig. 3. The rear faces of the coupons 7 are preferably left blank, although the portion of the back of the check at the base of the coupons is subdivided into blocks 9 which correspond in number and arrangement to the coupons and receive key numbers 10. Adjacent each series of key numbers 10 is a key phrase 11 which is explanatory of the value of the key number and is of such a length that it can not be covered up when one or two of the coupons 7 are folded rearwardly against the back of the check. The key numbers 10 and key phrases 11 read up and down on the body of the check, while the numbers 8 on the front of the coupon 7 extend transversely of the check and are readable from one end of the check. The values 8 on the coupons 7 are given in full, while the key numbers 10 are merely abbreviations and must be considered in connection with the key phrases 11 to give the proper value.

Fig. 2 indicates a check which has been made payable to the order of John Doe for the amount of $53,982,410.74. At the top of the check all of the coupons 7 have been completely cut away and severed from the body of the check with the exception of the coupon $7^a$ for the value of $50,000,000., the coupon $7^b$ for the value of $3,000,000., the coupon $7^c$ for the value of $900,000., the coupon $7^d$ for $80,000., and the coupon $7^e$ for $2,000. At the bottom of the check all of the coupons have been cut away with the exception of the coupon $7^f$ for $400., the coupon $7^g$ for $10., the coupon $7^h$ for 70¢, and the coupon $7^i$ for 4¢. The sum total of the values indicated by these remaining coupons corresponds to the amount for which the check is payable. These remaining coupon tabs are adapted to be folded rearwardly against the back of the check so that they will be in an out of the way position and not liable to be torn or mutilated as the check is handled. The key numbers 10 correspond to the values upon the coupons 7, as has been previously indicated, so that when looking at the back of the check and examining the coupon tabs which have been left attached to the check and folded rearwardly against the same, the key numbers serve as checks upon the numerical values indicated upon the tabs. Any attempt to change these numerical values 8, as indicated upon the tabs would be readily detected by comparing these values with the values of the key numbers, and it would thus be absolutely impossible to raise the check without detection. It will be obvious that the cash value for which a check can be drawn and protected in this manner extends between wide margins and is really many times more than ample for ordinary personal and business use. Furthermore, the exact value for which a check is drawn is accurately indicated to the fraction of a dollar, and not merely within certain limits as is sometimes done.

Having thus described the invention, what I claim as new and desire to secure by Letters Patent, is:—

1. A safety check including a body having a marginal portion subdivided into coupons which extend transversely from the body of the check and have numerical values written on the face thereof, said values progressing systematically from one end of the check to the other end so that the amount for which the check is payable can be indicated by cutting away all of the coupons with the exception of those having a total value equal to the value of the check, the rear face of the body of the check being provided at the base of the coupons with key means arranged for coöperation with the numerical values on the coupons to check up the same when the coupons are folded against the back of the check.

2. A safety check including a body having a marginal portion subdivided into coupons which extend transversely from the body and have numerical values upon the front thereof, said values increasing systematically from one end of the check to the other end of the check so that the amount for which the check is payable can be indicated by cutting away all of the coupons with the exception of those having a total value equal to the amount of the check, the rear face of the body of the check being provided at a point adjacent the said marginal portion with abbreviated key numbers corresponding to the coupons and arranged in series, and with a key phrase for each series of abbreviated key numbers, the key numbers and key phrases serving as a check upon the coupons and enabling the values of the latter to be readily verified when the coupons are folded against the back of the check.

3. A safety check including a body having a marginal portion subdivided into coupons which extend transversely from the body of the check and have numerical values on the face thereof, said values progressing in series by units, then by tens, and then by hundreds for the units, tens and hundreds of each denomination so that the amount for which the check is payable can be indicated by cutting away all of the coupons with the exception of those having a total value equal to the amount of the check, the back of the body being provided at a point adjacent the before mentioned marginal portion with abbreviated key numbers corresponding to the coupons and arranged in corresponding series, and key phrases being provided for each series of abbreviated key numbers, and the numbers and phrases enabling the values of the coupons remaining attached to the check body to be verified when the said coupons are folded against the back of the check body.

4. A safety check including a body having a marginal portion at one of the longitudinal edges thereof, said marginal portion being set off from the body of the check by a longitudinal division line and subdivided by transverse division lines into a series of independent coupons which have numerical values on the front faces thereof, said values progressing in series by units, then by tens, and then by hundreds for the units, tens and hundreds of each denomination, so that the amount for which the check is payable can be indicated by cutting away all of the coupons with the exception of those having a total value equal to the amount of the check, the back of the check body having the space thereof adjacent the before mentioned marginal portion subdivided by division lines into blocks corresponding to the coupons, said blocks receiving abbreviated key numbers which are arranged in series corresponding to the series of the numbers on the coupons, a key phrase being provided adjacent each series of abbreviated key numbers, and the key numbers and key phrases enabling the values of the coupons to be verified and checked up when the latter are folded rearwardly against the back of the check body.

In testimony whereof I have signed my name to this specification in the presence of two subscribing witnesses.

REINHARDT O. GROSCHUPP.

Witnesses:
J. L. COON,
U. J. GEYER.

Copies of this patent may be obtained for five cents each, by addressing the "Commissioner of Patents, Washington, D. C."